United States Patent [19]

Sawahashi et al.

[11] Patent Number: 5,768,306
[45] Date of Patent: Jun. 16, 1998

[54] SLIDING CORRELATOR USED IN CDMA SYSTEMS TO ESTABLISH INITIAL SYNCHRONIZATION

[75] Inventors: Mamoru Sawahashi, Yokosuka; Fumiyuki Adachi, Yokohama, both of Japan

[73] Assignee: NTT Mobile Communications Network, Inc., Japan

[21] Appl. No.: 906,133

[22] Filed: Jul. 25, 1997

Related U.S. Application Data

[63] Continuation of Ser. No. 428,204, filed as PCT/JP94/01461 published as WO95/07577, abandoned.

[30] Foreign Application Priority Data

Sep. 6, 1993 [JP] Japan ................................. 5-221104

[51] Int. Cl.$^6$ ........................................... H04B 1/707
[52] U.S. Cl. ........................... 375/206; 375/208; 375/202; 370/342
[58] Field of Search ................................. 375/202, 206, 375/208, 204, 207, 209, 210, 260, 343, 367; 364/728.03, 728.05, 728.07; 370/441, 335, 342

[56] References Cited

U.S. PATENT DOCUMENTS

| | | | |
|---|---|---|---|
| 4,400,790 | 8/1983 | Chambers | 364/604 |
| 4,752,939 | 6/1988 | Amoroso et al. | 375/202 |
| 4,829,467 | 5/1989 | Ogata | 395/732 |
| 4,875,221 | 10/1989 | Mori | 375/208 |
| 5,022,047 | 6/1991 | Dixon | 375/208 |
| 5,144,640 | 9/1992 | Yamamoto | 375/208 |
| 5,144,641 | 9/1992 | Akazawa et al. | 375/208 |
| 5,222,100 | 6/1993 | Lundquist | 375/200 |
| 5,359,605 | 10/1994 | Urbansky et al. | 375/372 X |
| 5,495,509 | 2/1996 | Lundquist et al. | 375/367 |
| 5,544,155 | 8/1996 | Lucas et al. | 370/342 |
| 5,574,721 | 11/1996 | Magill | 370/342 |
| 5,675,608 | 10/1997 | Kim et al. | 375/208 |

*Primary Examiner*—Young T. Tse
*Attorney, Agent, or Firm*—Rogers & Wells LLP; George P. Hoare, Jr.

[57] ABSTRACT

A sliding correlator is disclosed for establishing initial synchronization to spectrum-despread a received signal into a narrow band signal in a radio receiver in a spread spectrum CDMA system. The a sliding correlator can achieve high speed synchronization. A received signal is stored in a memory circuit (43). The received signal is read from the memory circuit (43) at a frequency substantially higher than the storing rate of the received signal. The read received signal is multiplied by a replica of a spreading code sequence by means of a multiplier (45), and the output signal of the multiplier (45) is accumulated by an accumulator (46) over a predetermined time period. The output of the accumulator (46) is decided by a threshold detector (47) whether or not it exceeds a predetermined threshold. When the output of the threshold detector (47) is less than the threshold, the phase of the spreading code sequence is shifted, and the detection is repeated. Since the correlation is taken by reading the received signal from the memory circuit (43) at a high speed, the initial synchronization can be established quickly.

2 Claims, 7 Drawing Sheets

SLIDING CORRELATOR USED IN CDMA SYSTEMS TO ESTABLISH INITIAL SYNCHRONIZATION

This application is a continuation of application Ser. No. 08/428,204, filed as PCT/JP94/01461, published as WO95/07577, now abandoned.

TECHNICAL FIELD

The present invention relates to a sliding correlator used in a receiver portion of a radio device of a CDMA system performing multiple access using a spectrum spread technique in mobile communications, which sliding correlator is provided to establish initial synchronization for despreading a spread spectrum received signal into a narrow band signal.

BACKGROUND ART

CDMA systems can be roughly divided into a direct sequence (DS) system and a frequency hopping (FH) system. In the FH system, each symbol must be resolved into small elements called chips, and the central frequencies of the chips must be varied at a high rate to generate a signal. This makes it difficult to implement the FH system, and hence, the DS system is generally used. In contrast with SCPC/FDMA (Single Channel Per Carrier/Frequency Division Multiple Access) radio devices or TDMA (Time Division Multiple Access) radio devices, spread spectrum (SS) radio devices carry out, at a transmitter side, a common modulation followed by a secondary modulation using a spreading code sequence, and transmits a thus bandwidth spread signal. At a receiver side, on the other hand, the wideband received signal is despread to restore the original narrow band signal, followed by the conventional demodulation. During this despreading process at the receiver side, the spreading code sequence in the received signal must be synchronized with a replica of the spreading code sequence generated at the receiver side.

This synchronization of the replica of the spreading code sequence at the receiver side using the spreading code sequence in the received signal is separated into two distinct phases called an initial acquisition phase and a tracking phase. Since the autocorrelation of the spreading code sequence can only be obtained in a range of ± one chip, the initial acquisition phase must capture the phase difference between the spreading code sequence and the reference replica thereof within a range of a small fraction of the chip interval ±Tc. Then, the tracking phase holds the code sequences in this range. The present invention particularly relates to the initial synchronization, and hence, a conventional initial synchronization method will be described below.

The initial synchronization of the spreading code sequence is roughly divided into coherent and incoherent ones. In the coherent synchronization, the phase of the carrier of a received signal must be known in advance. Generally speaking, it is difficult to obtain the phase of the carrier before despreading because the carrier at the receiving end is not synchronized with the carrier at the transmitter end. Accordingly, the incoherent synchronization is conventionally used, in which the received signal is despread by a replica of the spreading code sequence at the receiving end, followed by a detection using a square amplitude detection after band limiting, and then by a threshold detection.

The incoherent initial synchronization of a common spreading code sequence is performed by multiplying the spreading code sequence of a received signal and a replica of the spreading code sequence at the receiving end, thereby taking correlation between the two code sequences. Then, the correlation output is detected, and the establishment of the synchronization is detected by testing whether or not the detection output exceeds a threshold. If the synchronization has not yet been established, the phase of the replica of the spreading code sequence is shifted, and the detection of the synchronization is tested again. This is performed until the synchronization is established. This method is called sliding correlation.

The initial synchronization using the sliding correlation is divided into classes depending on whether the time interval (dwell time) $\tau_d$ for integrating a correlation signal is fixed or variable. The fixed integral time method can be further divided into a single dwell type and a multiple dwell type. These types correspond to whether the detection of the output signal from a detector is achieved by a single time integral, or by a plurality of time integrals. An increasing dwell time is required to improve accuracy of detection of the initial synchronization.

First, the initial synchronization using the single dwell type sliding correlation will be explained.

FIG. 1 shows a block diagram of a conventional single dwell synchronization system using the sliding correlation. In an incoherent detection, the despreading process is not provided with information about the phase of a carrier. A received signal from an input terminal 11, which includes noise components, is multiplied, by means of a multiplier 13, with the replica of the spreading code sequence fed from a spreading code sequence replica generator 12, and thus, the correlation is calculated. The output of the multiplier 13 is passed through a bandpass filter 14, and is amplitude-detected by a square amplitude detector (square-law detector) 15. The detected output is integrated by an integral-dump circuit 16 over a dwell time $\tau_d$. The integrated output undergoes threshold detection by a threshold detector 17, and if the integrated output is lower than a threshold, a signal is sent to the voltage controlled clock generator 18 to change the clock speed. Thus, the operation rate of the replica generator 12 is controlled by the clock from the voltage controlled clock generator 18.

FIG. 2 shows a block diagram of an equivalent representation of a lowpass single dwell synchronization system using the sliding correlation. A received input signal undergoes quadrature detection to produce an I channel signal and a Q channel signal. The I and Q channel signals are passed through lowpass filters 22 and 23, and then converted into digital signals by A/D converters 24 and 25, respectively. Although the quadrature-detected outputs are subjected to direct modulation by the spreading code sequence, the phase of the spreading code sequence is unknown. The quadrature-detected outputs are supplied to multipliers 13I and 13Q, and are multiplied by the replica fed from the spreading code sequence replica generator 12. The despread I and Q channel signals are passed through lowpass filters 26 and 27, and are square-amplitude-detected by square amplitude detectors 15I and 15Q. The amplitude-detected signals are amplitude-combined by an adder 28, integrated by the integral-dump circuit 16, and are compared with the threshold by the threshold detector 17.

FIG. 3 shows a block diagram of a multiple dwell synchronization system. A received signal from the input terminal 11 is multiplied, by means of the multiplier 13, with the replica of the spreading code sequence fed from the spreading code sequence replica generator 12. The output of the multiplier 13 is amplitude-detected by the square amplitude detector 15, and the output thereof is inputted to N integral-dump circuits $16_1$–$16_N$. Denoting the dwell times of the integral-dump circuits $16_1$–$16_N$ by $\tau_{d1}$–$\tau_{dN}$, respectively, it is assumed that the relationships of the dwell times of the N integral-dump circuits $16_1$–$16_N$ are as follows:

$$\tau_{d1} \leq \tau_{d2} \leq \tau_{d3} \leq \ldots \leq \tau_{dN}$$

The probability that each output signal $Z_i$ exceeds its threshold depends on the probabilities that previous respective outputs $Z_k$ (k: 1, i−1) exceed their own thresholds. In view of this, only when all the levels of the output signals of the previous integral-dump circuits $16_1$–$16_{i-1}$ exceed their thresholds, the i-th integral-dump circuit $16_i$ compares its output signal with its threshold. If the output of at least one of the previous integral-dump circuit $16_k$ is below its threshold, the phase of the replica of the spreading code sequence is renewed, and all the integral-dump circuits 16 are reset to proceed to the next search.

To complete the search for detecting synchronization, it is necessary to start the test from the first integral-dump circuit $16_1$, and to continue it sequentially until the test of the output of the N-th integral-dump circuit $16_N$ has been completed.

In a word, a synchronization detector (coherent detector) 32 detects the synchronization in accordance with the following algorithm.

(1) It judges that the synchronization is established and completes the search when it detects that all the output signals $Z_1$–$Z_N$ of the N integral-dump circuits $16_1$–$16_N$ exceed their own thresholds.

(2) If it detects that one of the detector outputs $Z_i$ fails to pass the threshold test, and hence, judges that the current phase state is incorrect, it continues the search. In this case, it delays by a predetermined amount the phase of the replica of the spreading code sequence produced from the spreading code sequence replica generator 12.

In the multiple dwell synchronization system with the arrangement of FIG. 3, the maximum time for detecting whether the synchronization is established or not about the spreading code sequence of a particular phase is $\tau_{dN}$, and the minimum time is $\tau_{d1}$. Accordingly, the synchronization can be detected for almost all the phases of the replica of the spreading code sequence in a test interval of the dwell time $\tau_{dk}$ (k<N). In the single dwell synchronization system, on the other hand, the test interval equals $\tau_{dN}$ in all the cells. Thus, the multiple dwell synchronization system can shorten the initial synchronization time as compared with the single dwell synchronization system.

In the multiple dwell synchronization system, the integral time interval of respective integral-dump circuits $16_1$–$16_N$ overlap with each other. Accordingly, an actual circuit can be implemented by a single integrator without using the N parallel integral-dump circuits $16_1$–$16_N$. The single integrator outputs intermediate values at the times $t=\tau_{d1}, \tau_{d2}, \ldots \tau_{dN}$, and the outputted integrated values are sequentially compared with their thresholds. The integrator is reset when the synchronization is not detected, and hence, the search of the next phase of the spreading code sequence must be started.

Since the sliding correlators obtain the correlation between the spreading code sequence in the received signal and the replica of the spreading code sequence which is generated at the receiving end, by time integrations, they can be arranged as a considerably small circuit appropriate to be constructed into an LSI circuit. The sliding correlator, however, takes a long time to establish the initial synchronization because of time integrations as described above.

It is therefore an object of the present invention to provide a sliding correlator that can establish synchronization quickly.

DISCLOSURE OF THE INVENTION

In a first aspect of the present invention, there is provided a sliding correlator comprising:

a memory circuit for storing a received signal;

a timing generator for generating a clock signal used for reading the received signal stored in the memory circuit at a frequency substantially higher than a storing rate of the receive signal;

a spreading code sequence replica generator for generating a replica of a spreading code sequence;

a multiplier for multiplying the read received signal with the replica of the spreading code sequence;

an accumulator for accumulating an output signal of the multiplier over a predetermined time period;

a threshold detector for detecting whether or not an output signal of the accumulator exceeds a predetermined threshold; and a clock generator for controlling the spreading code sequence replica generator to generate the spreading code sequence at the same rate as that of the clock signal, the clock generator changing a phase of the replica of the spreading code sequence when a detection output of the threshold detector is less than the threshold.

In a second aspect of the present invention, there is provided a sliding correlator comprising:

a memory circuit for storing a received signal;

a timing generator for generating a clock signal used for reading the received signal stored in the memory circuit at a frequency substantially higher than a storing rate of the receive signal;

a spreading code sequence replica generator for generating a plurality of replicas of a spreading code sequence, the replicas having different phases;

a plurality of multipliers, each of which multiplies the read received signal by one of the plurality of replicas of the spreading code sequence;

a plurality of accumulators, each of which accumulates an output signal of one of the plurality of multipliers over a predetermined time period;

a threshold detector for detecting whether or not each of output signals of the plurality of accumulators exceeds a predetermined threshold; and a clock generator for controlling the spreading code sequence replica generator to generate the spreading code sequence at the same rate as that of the clock signal, the clock generator changing a phases of the replicas of the spreading code sequence by using an output of the threshold detector when all output signals of the plurality of the accumulators are less than the threshold.

The sliding correlator in accordance with the present invention can be applied, for example, to a receiver of a CDMA system which performs multiple access by using spread spectrum in a mobile communication system, and can quickly establish the initial synchronization for despreading a received signal into a narrow band signal.

BEST MODE FOR CARRYING OUT THE INVENTION

Embodiments of the present invention will now be described with reference to the accompanying drawings.

Figure 1:
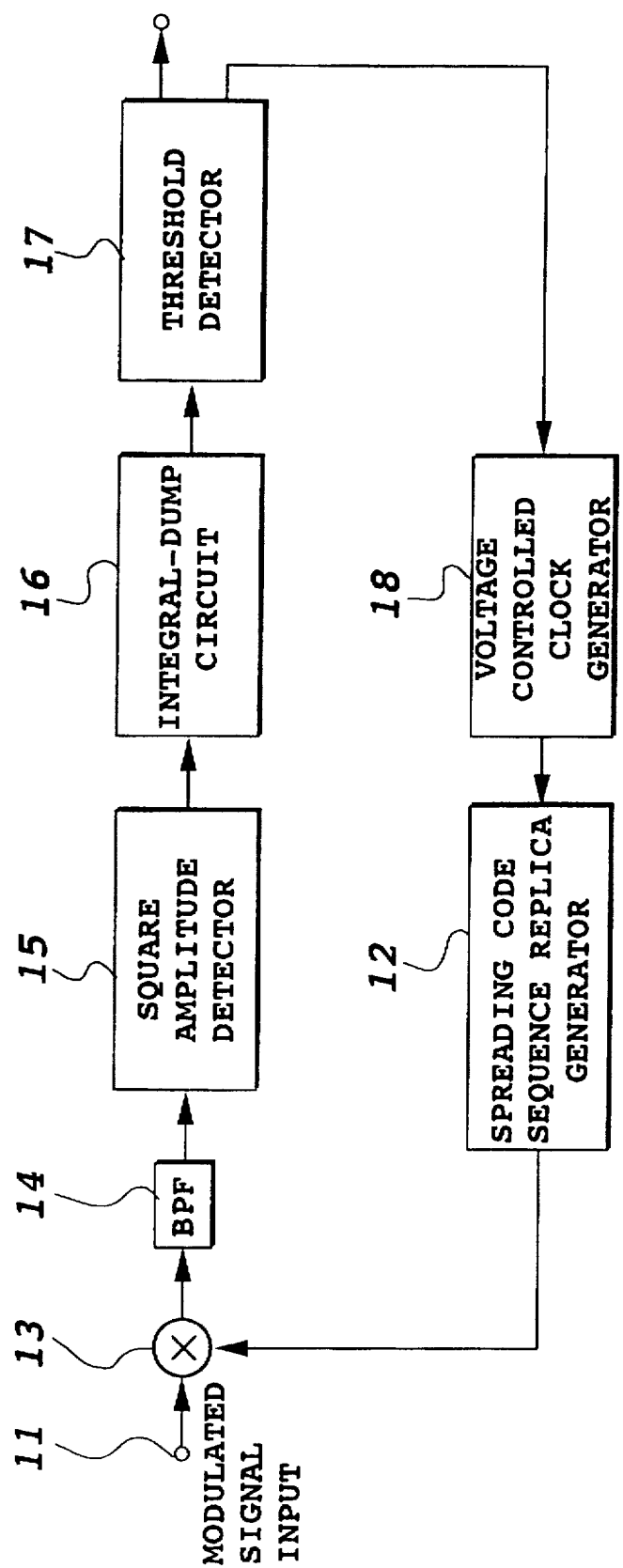
FIG. 1 is a block diagram showing a conventional single dwell synchronization system.
Figure 2:
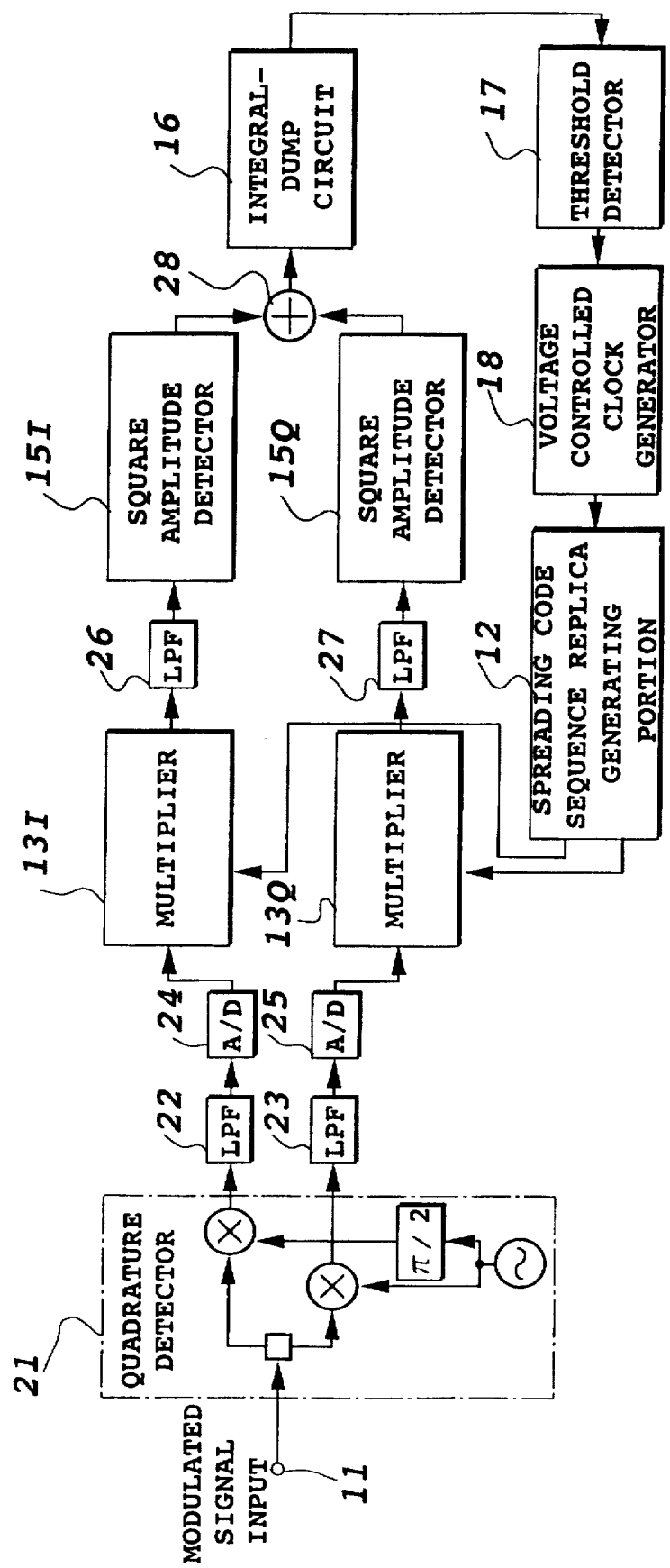
FIG. 2 is a block diagram showing a conventional quadrature detection sliding correlator.
Figure 3:
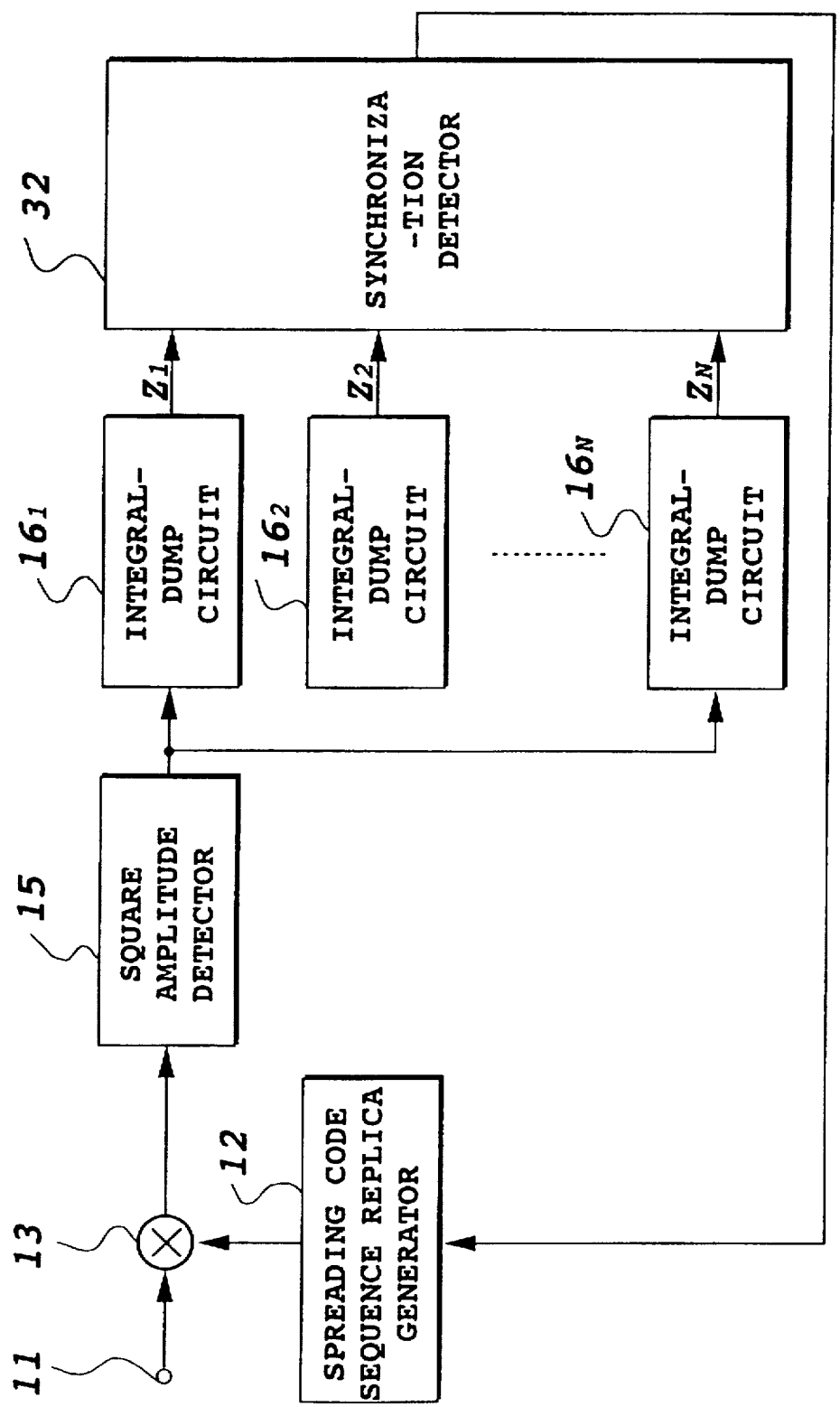
FIG. 3 is a block diagram showing a conventional multiple dwell synchronization system.
Figure 4:
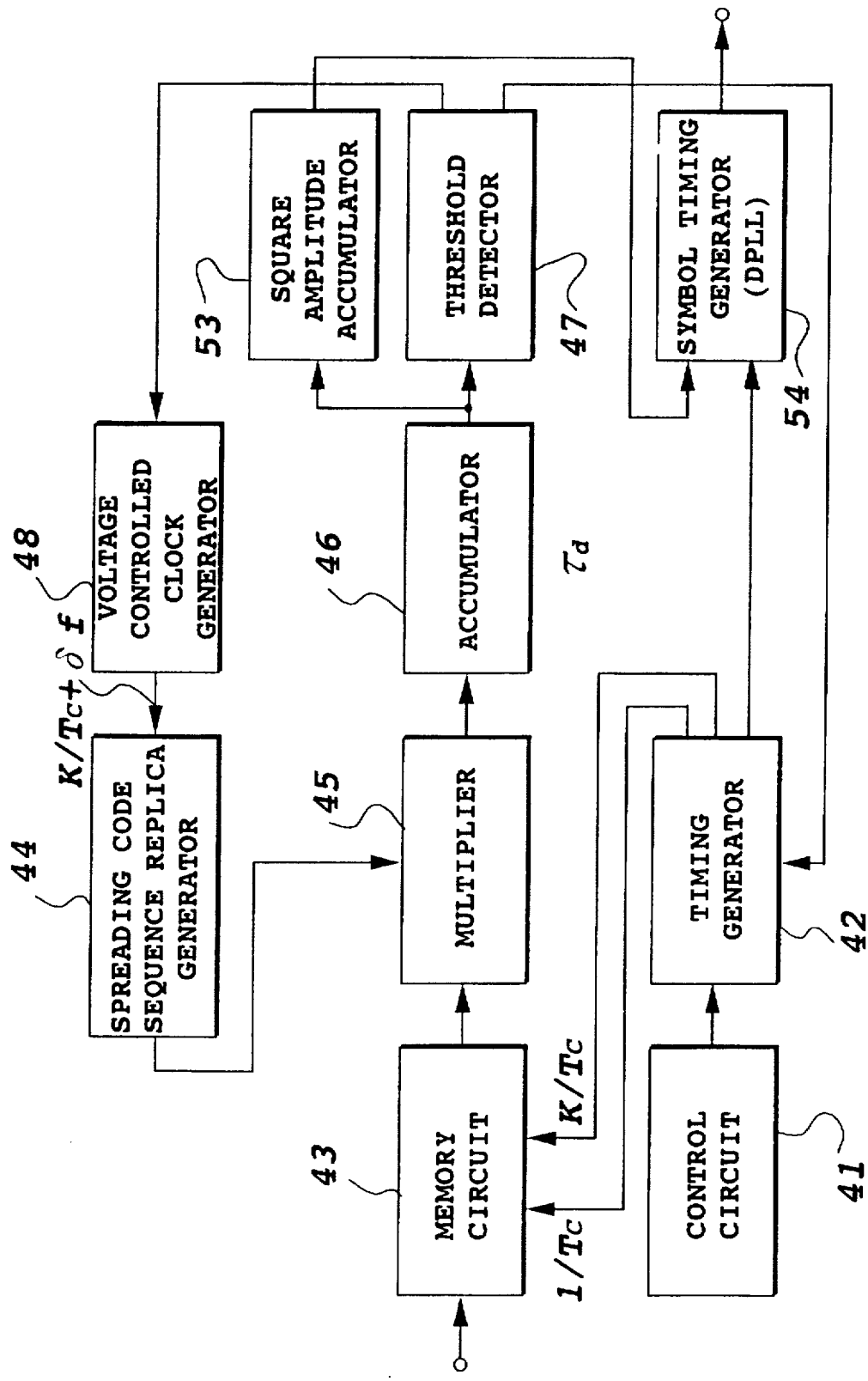
FIG. 4 is a block diagram showing an embodiment of a sliding correlator in accordance with the present invention.

FIG. 4 is a block diagram of a basic embodiment of a sliding correlator in accordance with the present invention. In FIG. 4, the reference numeral 43 designates a memory circuit for storing A/D converted received signals corresponding to a dwell time τd plus a predetermined amount α. The reference numeral 42 denotes a timing generator which generates, under the control of a control circuit 41, a write timing signal and a read timing signal, which are supplied to the memory circuit 43. The rate of the read timing signal is K times higher than that of the write timing signal. The reference numeral 45 designates a multiplier which multiplies the received signal read from the memory circuit with a replica of the spreading code sequence fed from a spreading code sequence replica generator 44. The reference numeral 46 denotes an accumulator which accumulates the product of the replica and the spreading code sequence of the received signal over the dwell time $\tau_d$. The reference numeral 47 designates a threshold detector which detects whether or not the initial synchronization is established on the basis of the accumulated value of the product of the replica and the spreading code sequence of the received signal over the dwell time $\tau_d$. The reference numeral 48 designates a voltage controlled clock generator for generating, in response to the output of the threshold detector 47, a clock signal to be supplied to the spreading code sequence replica generator 44. The output of the threshold detector 47 is also inputted to the timing generator 42 to control the read timing signal supplied to the memory circuit. The reference numeral 53 designates a square amplitude accumulator which accumulates the received signal multiplied by the replica of the spreading code sequence over one symbol interval after the initial synchronization has been established. The reference numeral 54 denotes a symbol timing generator composed of a DPLL (Digital Phase-Locked Loop) which generates the symbol timing based on the output from the square amplitude accumulator 53 and the output from the timing generator 42.

Figure 5:
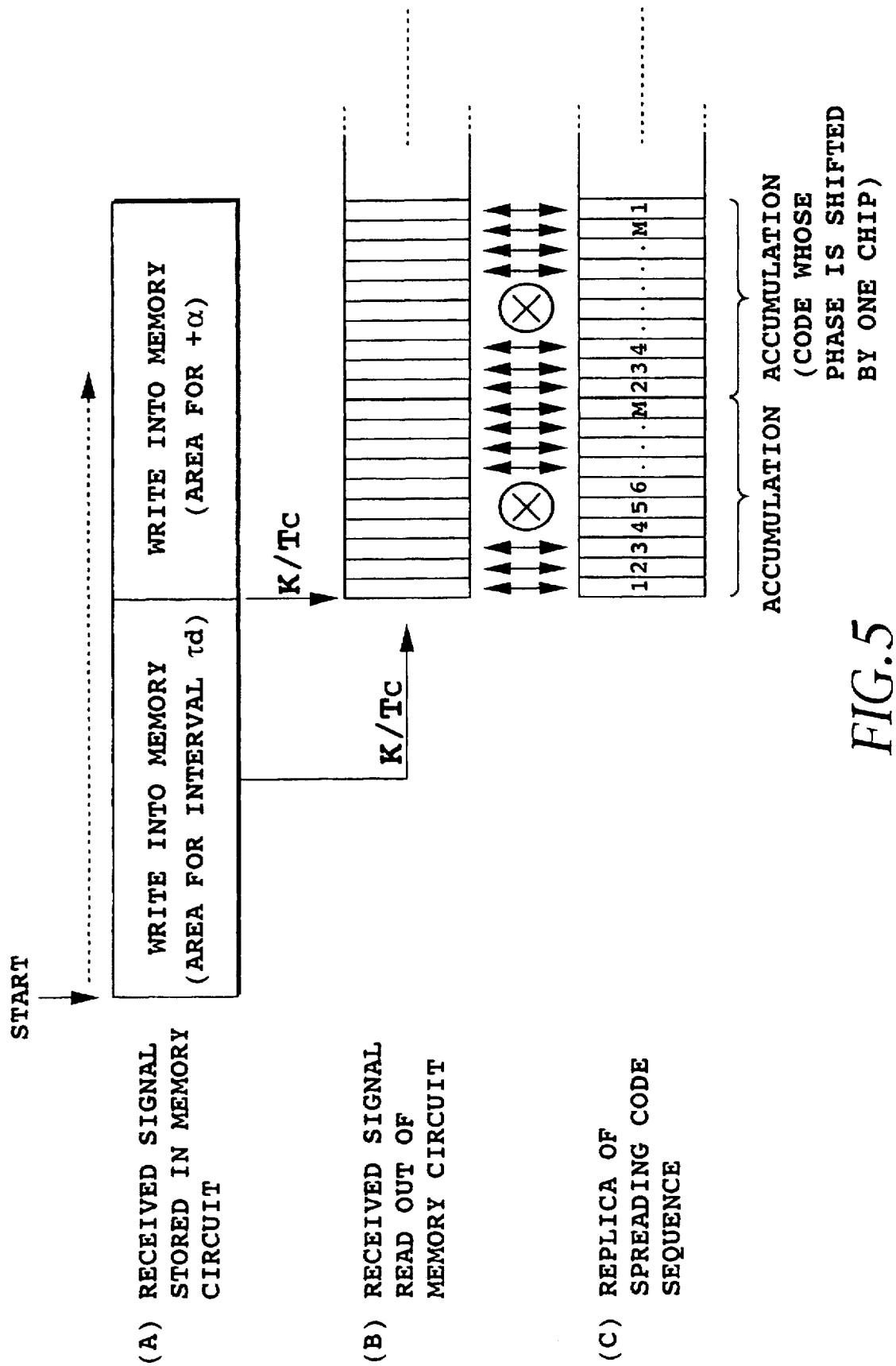
FIG. 5 is a diagram illustrating the operation of the sliding correlator shown in FIG. 4.

FIG. 5 is a diagram illustrating the operation of the initial synchronization of the embodiment with the arrangement as shown in FIG. 4. The sliding correlation operation of the embodiment for the initial synchronization will now be described with reference to FIGS. 4 and 5.

In the explanation below, we assume the following: The dwell time $\tau_d$ is made equal to one symbol interval in this embodiment because the dwell time is usually set at that value. The memory circuit 43 has a capacity capable of storing the received signal corresponding to 1 symbol+α. Furthermore, the frequency of the write timing signal and that of the read timing signal produced by the timing generator 42 are set at 1/TC and K/TC, respectively, where TC is one chip period. Accordingly, M correlation values (multiplications) are obtained by the accumulation, where M=one symbol period/TC. These assumptions can be changed rather arbitrarily.

The timing generator 42 begins to output the write timing signal in response to a start signal from the control circuit 41, and the A/D converted received signal is stored into the memory circuit 43 (see, (A) of FIG. 5). When the received signal is stored by an amount corresponding to the dwell time $\tau_d$ (that is, an amount corresponding to one symbol in this case), the read timing signal whose frequency is K times that of the write timing signal is outputted from the timing generator 42. Thus, the received signal is read out of the memory circuit 43 at a rate K times higher than the writing rate (see, (B) of FIG. 5). The read received signal and a replica (see, (C) of FIG. 5) of the spreading code sequence are multiplied by the multiplier 45, the replica being generated by the spreading code sequence replica generator 44 at the same frequency as the read timing signal, and the product is accumulated by the accumulator 46 over the dwell time $\tau_d$ (one symbol period in this case). The threshold detector 47, receiving the output of the accumulator 46, detects whether the initial synchronization is established.

If the synchronization is not established, the voltage controlled clock generator 48 controls, in accordance with the output of the threshold detector 47, the spreading code sequence replica generator 44 so that the phase of the replica of the spreading code sequence therefrom is delayed by one chip interval. In addition, the same received signal is read again by the read timing signal outputted from the timing generator 42 in response to the output of the threshold detector 47. Then, the multiplication and the accumulation are performed again, and the result is inputted to the threshold detector 47. The above-mentioned operation is repeated until the threshold detector 47 detects that the initial synchronization has been established.

When the threshold detector 47 detects that the initial synchronization is established, its output is supplied to the timing generator 42 and the voltage controlled clock generator 48, thereby stopping the sliding operation for the initial synchronization. Subsequently, the timing generator 42 and the voltage controlled clock generator 48 output a timing signal of the chip period or the like rather than of K times the normal rates.

Since the present invention performs the correlation detecting operation at a rate K times higher than the chip frequency, the interval required to establish the initial synchronization is reduced by a factor of K as compared with the conventional sliding correlation, which enables a high speed synchronization.

The timing signal of symbols of the synchronized received signal is amplitude-squared by the square amplitude accumulator 53, and accumulated over one symbol interval, so that its result is supplied to the symbol timing generator 54, and the symbol timing is formed.

It is sufficient for the memory circuit to have a capacity that can store the received signal corresponding to the dwell time $\tau_d$ during which the received signal is read out repeatedly (an amount corresponding to the received signal during one symbol interval in this case), plus a capacity that can store the received signal in the worst case for establishing the initial synchronization.

High speed synchronization establishment is necessary for the sliding correlator to be applied to CDMA mobile communications. In particular, in the control channel establishment before entering communications, a base station is required to correctly receive, from the very beginning, a reversal control channel signal from a mobile station. In this case, the receive timing of the control channel signal at the base station can be roughly estimated on the basis of the transmission timing of a control channel signal from the base station to the mobile station. The control circuit 41 controls the timing generator 42 so that the writing to the memory circuit 43 is started at that timing.

Although the sliding correlator of FIG. 4 is a single dwell type, the present invention can also be applied to a multiple dwell type. In this case, the arrangement of FIG. 4 may be modified to include a plurality of accumulators 46, each provided in order to accumulate over different dwell times, and the outputs of the accumulators are inputted to the threshold detector in parallel so that the detection is made in terms of each of the inputs. Alternatively, the accumulator 46 may be constructed so that it produces intermediate values which are used for detection. Although it is assumed that the A/D conversion and the writing to the memory circuit are performed at one chip period, it is obvious that these operations can be carried out at a higher rate.

Moreover, the initial synchronization can be established at a higher rate by performing parallel calculations by replacing the multiplier 45 and the accumulator 46 by a plurality of multipliers and accumulators in the sliding correlator shown in FIG. 4. An example of this is shown in FIG. 6.

Figure 6:
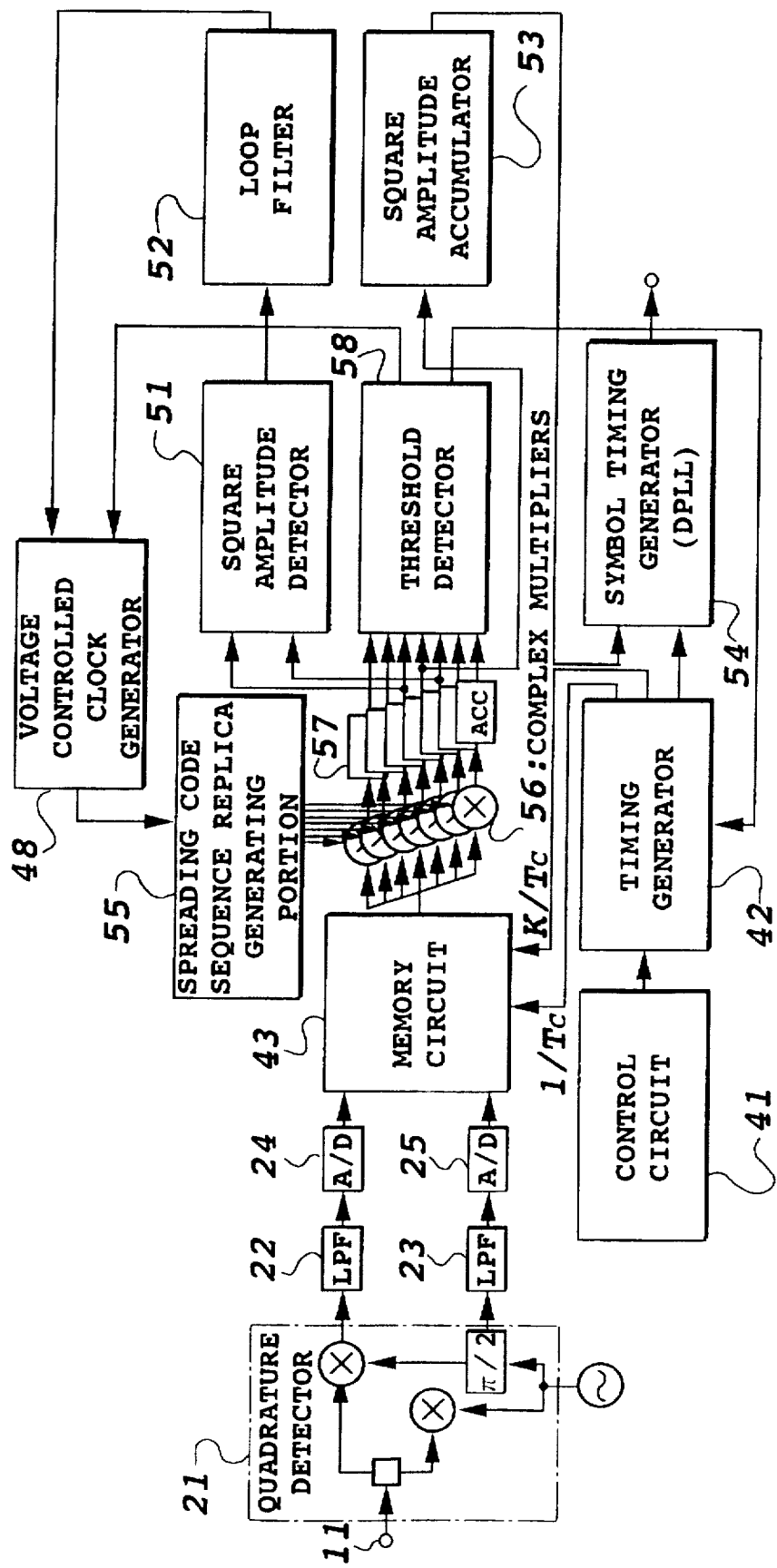
FIG. 6 is a block diagram showing another embodiment of a sliding correlator in accordance with the present invention.

In FIG. 6, the reference numeral 11 designates an input terminal, 21 designates a quadrature detector, 22 and 23 designate lowpass filters, and 24 and 25 designate A/D converters. The reference numeral 43 designates a memory circuit, 56 denotes N complex multipliers, 57 designates N accumulators which can perform parallel operation. The reference numeral 58 designates a threshold detector which parallelly detects thresholds of the accumulated values from the plurality of accumulators. The reference numeral 51 designates a square amplitude detector, 52 denotes a loop filter, 48 designates a voltage controlled clock generator, all of which perform tracking. The voltage controlled clock generator 48 is used to establish the initial synchronization, as well. The reference numeral 55 designates a spreading code sequence replica generator that can generate in parallel replicas corresponding to a plurality of phases of a spreading code sequence. The control circuit 41, the timing generator 42, the square amplitude accumulator 53, and the symbol timing generator 54 are the same as those shown in FIG. 4.

The initial synchronization establishing operation of the parallel operating sliding correlator as shown in FIG. 6 will be described with reference to FIG. 7. In this case, the conditions identical to those in connection with FIGS. 4 and 5 are assumed.

The received signal from the input terminal 11 is converted into baseband signals through the quadrature detection by the quadrature detector 21. The baseband signals are passed through the lowpass filters 22 and 23, and converted into digital signals by the A/D converters 24 and 25, which digital signals are inputted to the memory circuit 43 (see (A) of FIG. 7). The memory circuit 43 performs writing and reading, as the memory circuit shown in FIG. 4 does, in accordance with the write timing signal and the read timing signal from the timing generator 42 controlled by the control circuit 41. The rate of the read timing signal is K times higher than that of the write timing signal (whose period equals chip period TC in this example). The same received signal is provided from the memory circuit 43 to the N complex multipliers 56. The spreading code sequence replica generating portion 55 provides respective multipliers 56 with codes having different phases but corresponding to the same spreading code sequence. The outputs of the multipliers 56 are each accumulated by the accumulators 57 individually over the dwell time $\tau_d$. Then, the threshold detector 47 detects the synchronization in terms of individual accumulated signals. The outputs of the spreading code sequence generator 55, of the complex multipliers 56, and of the accumulators 57, and the inputs of the threshold detector 58 are all parallel, thereby forming N paths.

Figure 7:
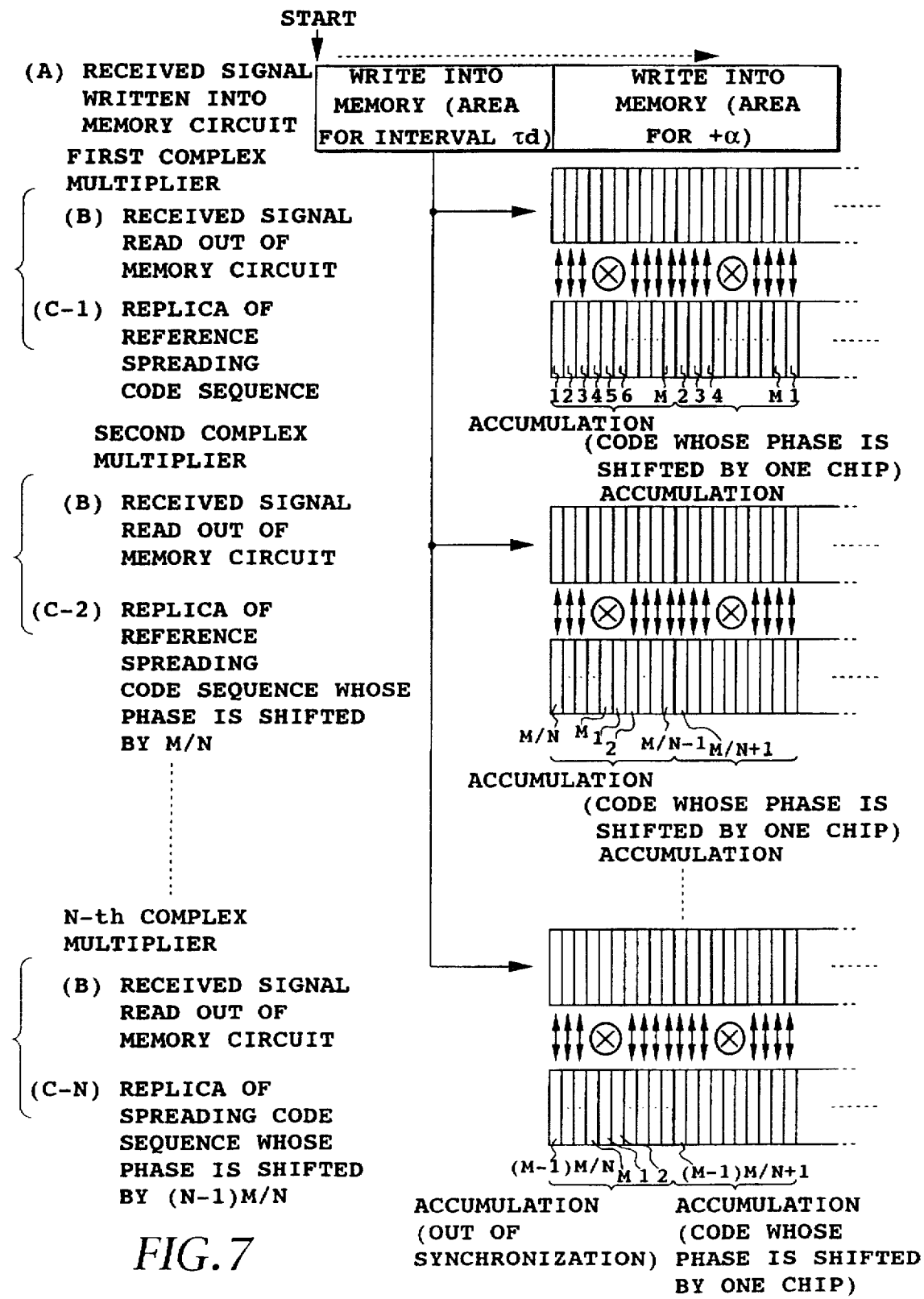
FIG. 7 is a diagram illustrating the operation of the sliding correlator shown in FIG. 6.

The respective complex multipliers 56 are provided in parallel from the memory circuit 43 with the same received signal which is read out by the read timing signal whose rate is K times that of chip rate (see, (B) of FIG. 7). In addition, the N complex multipliers 56 are provided from the spreading code sequence replica generator 55 with replicas having different phases but corresponding to the same spreading code sequence generated at the same frequency as the read timing signal. For example, the first complex multiplier is provided from the spreading code sequence replica generator 55 with a replica of the spreading code sequence, which replica has no phase difference (see, (C-1) of FIG. 7). The second complex multiplier is provided with a replica of the spreading code sequence, which replica has a phase difference of M/N chip (see, (C-2) of FIG. 7). Finally, the N-th complex multiplier is provided with a replica of the spreading code sequence, which replica has a phase difference of (N−1)M/N chip (see, (C-2) of FIG. 7). The complex multipliers 56 each perform complex multiplication chip by chip, and the accumulators 57 accumulate the products, respectively. Then, the threshold detector 58 detects whether the initial synchronization is established in terms of respective accumulations (that is, respective paths) after the complex multiplications and the accumulations have been performed over the dwell time $\tau_d$.

When the threshold detector 58 detects that no initial synchronization is established in any of the paths, it controls with its output the voltage controlled clock generator 48, thereby shifting the phases of all the replicas of the spreading code sequence by one chip, the replicas being generated by the spreading code sequence generator 55. The output of the threshold detector 58 is also applied to the timing generator 42 to restart the reading of the received signal from the memory circuit 43. The operation is continued until the decision is made that the initial synchronization is established. Since the circuit performs the calculation in parallel through N paths, the time for establishing the initial synchronization can be reduced by a factor of N in this circuit.

When the threshold detector 58 detects that the initial synchronization is established in any one of the paths, it controls the voltage controlled clock generator 48, thereby adopting the phase of the path, in which the synchronization has been established, as the phase of the replica of the spreading code sequence used for despreading from now on. Thus, the sliding operation for the initial synchronization has been completed. After this, the reading of the memory circuit 43 and the generation of the replica of the spreading code sequence are performed at the chip interval Tc.

On completing sliding for establishing the initial synchronization, a tracking operation is started. The tracking is carried out by generating a code having a phase advance of one chip with respect to the replica of the spreading code sequence with which the initial synchronization has been established, and a code having a phase delay of one chip with respect to the same replica by means of the spreading code sequence replica generator 55, and then, detecting correlation between the two codes. After the initial synchronization has been established, the complex multipliers 56 multiply the received signal with the code having the phase advance of one chip with respect to the replica of the spreading code sequence, and with the code having the phase delay of one chip, respectively. The products are accumulated by the accumulators 57 over one symbol interval so that the phase difference can be obtained. The two signals having a phase difference are each amplitude-squared by the square amplitude detector 51 to remove the transmission information component, and are added thereafter. This makes it possible to achieve tracking using an S curve characteristic. The output of the square amplitude detector 51 is averaged over a several symbol interval by the loop filter 52, thereby obtaining a phase error signal. The phase error signal is then inputted to the voltage controlled clock generator 48 so that the tracking is carried out by shifting the replica by one chip in accordance with the phase error signal.

INDUSTRIAL APPLICABILITY

As described above, the sliding correlator in accordance with the present invention is used in the receiver portion of a CDMA system which performs multiple access by using spread spectrum in mobile communications, for example, and can establish the initial synchronization quickly for restoring a narrow band signal by spectrum despreading.

What is claimed is:

1. A sliding correlator for a CDMA system using spreading code sequence with a chip rate of 1/TC where TC is a one chip period, comprising:

a memory circuit for storing a received signal;

a timing generator for generating a clock signal used for reading the received signal stored in said memory circuit at a frequency K times higher than a storing rate of (1/TC) of the received signal;

a spreading code sequence replica generator for generating a replica of a spreading code sequence with a chip rate of K/TC;

a multiplier for multiplying the read received signal with said replica of the spreading code sequence;

an accumulator for accumulating an output signal of said multiplier over a predetermined time period;

a threshold detector for detecting whether or not an output signal of said accumulator exceeds a predetermined threshold; and a clock generator for controlling said spreading code sequence replica generator to generate said spreading code sequence, said clock generator changing a phase of said replica of said spreading code sequence when a detection output of said threshold detector is less than the threshold.

2. A sliding correlator for CDMA systems using spreading code sequence with a chip rate of 1/TC where TC is one chip period, comprising:

a memory circuit for storing a received signal;

a timing generator for generating a clock signal used for reading the received signal stored in said memory circuit at a frequency K times higher than a storing rate of 1/TC of the received signal;

a spreading code sequence replica generator for generating a plurality of replicas of a spreading code sequence with a chip rate of K/TC, said replicas having different phases;

a plurality of multipliers, each of which multiplies the read received signal by one of said plurality of replicas of the spreading code sequence;

a plurality of accumulators, each of which accumulates an output signal of one of said plurality of multipliers over a predetermined time period;

a threshold detector for detecting whether or not each of output signals of said plurality of accumulators exceeds a predetermined threshold; and a clock generator for controlling said spreading code sequence replica generator to generate said spreading code sequence at the same rate as that of said clock signal (K/Tc), said clock generator changing the phases of said replicas of said spreading code sequence by using an output of said threshold detector when all output signals of said plurality of said accumulators are less than the threshold.

* * * * *